Oct. 21, 1924.
H. B. HARTMAN
OZONE GENERATOR
Filed March 2, 1923
1,512,285
3 Sheets-Sheet 2
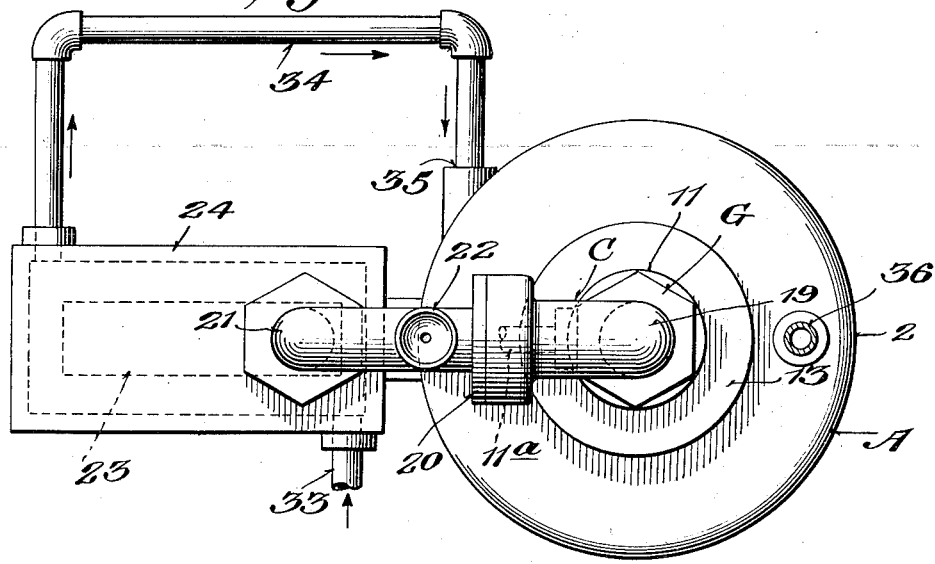
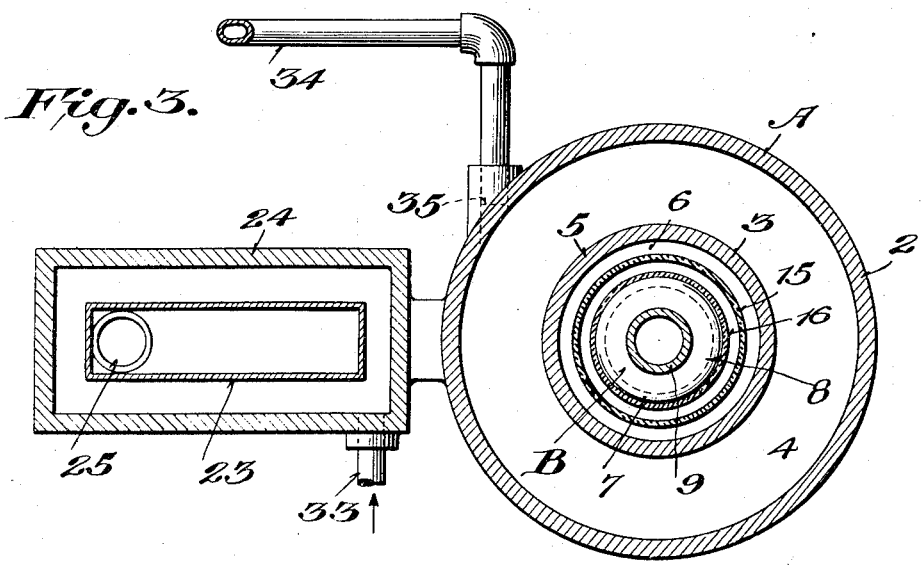

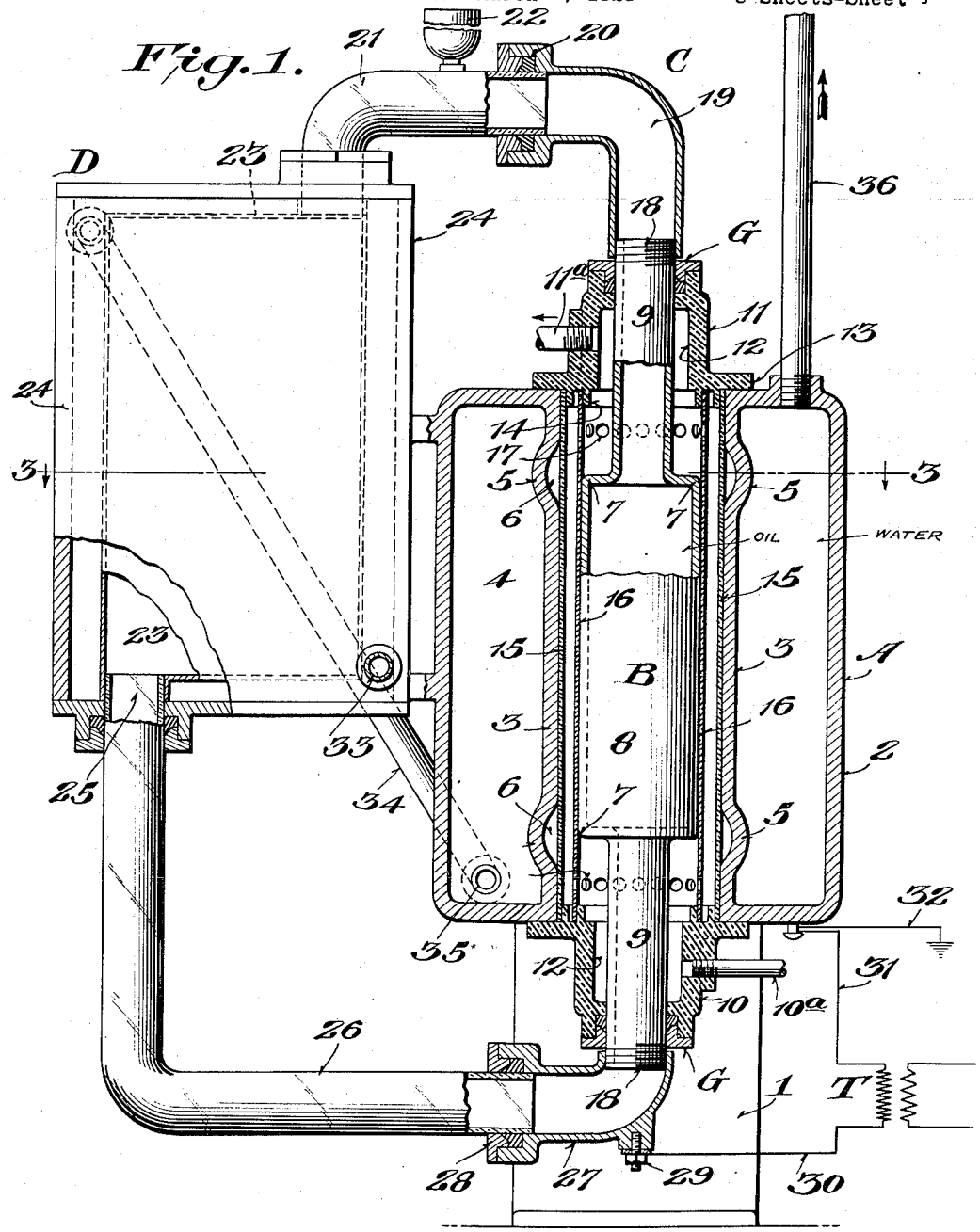

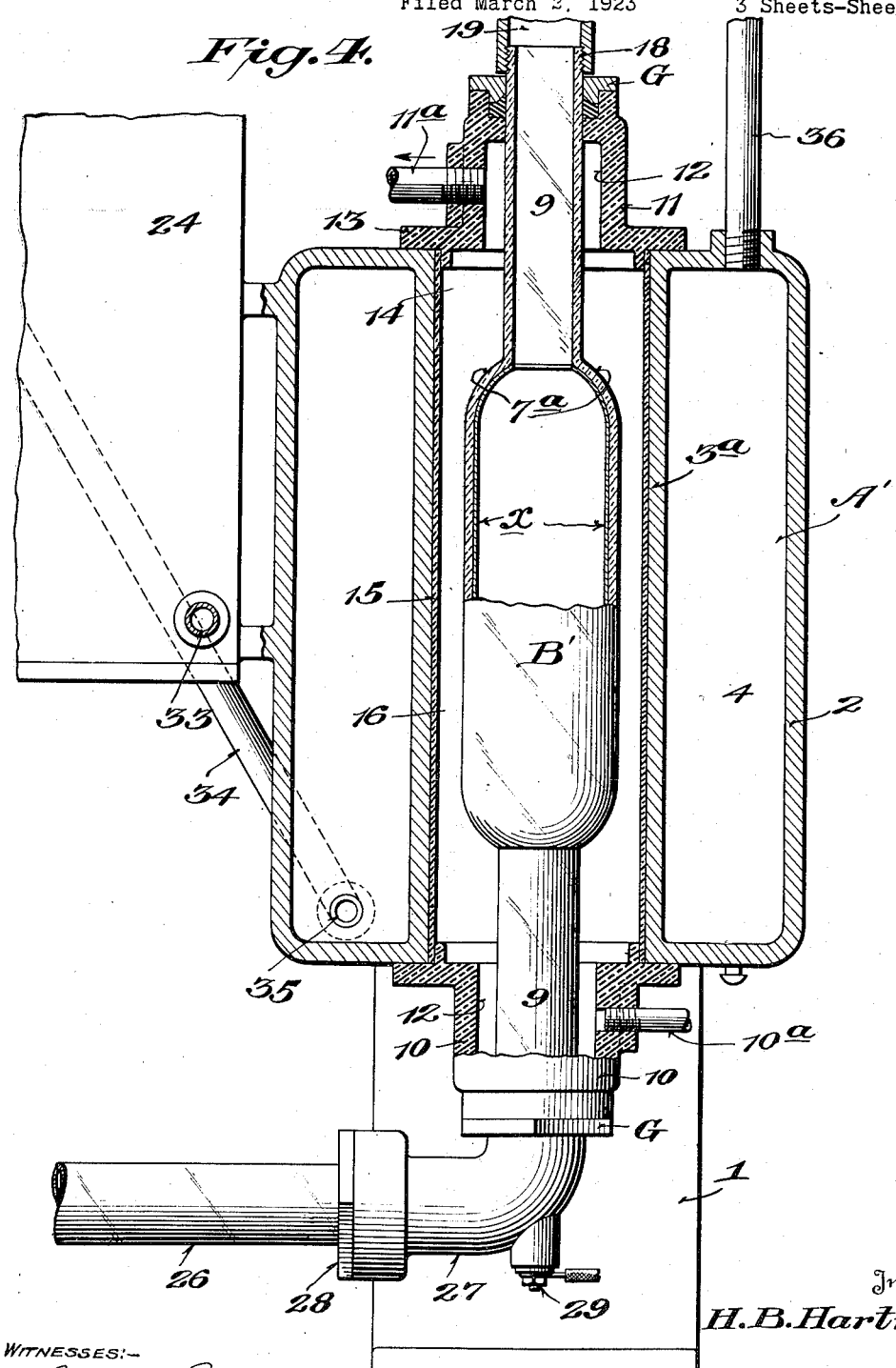

Patented Oct. 21, 1924.

1,512,285

UNITED STATES PATENT OFFICE.

HARRY BUXTON HARTMAN, OF SCOTTDALE, PENNSYLVANIA, ASSIGNOR TO ELECTRIC WATER STERILIZER & OZONE COMPANY, OF SCOTTDALE, PENNSYLVANIA, A CORPORATION OF PENNSYLVANIA.

OZONE GENERATOR.

Application filed March 2, 1923. Serial No. 622,349.

*To all whom it may concern:*

Be it known that I, HARRY B. HARTMAN, citizen of the United States, residing at Scottdale, in the county of Westmoreland and State of Pennsylvania, have invented certain new and useful Improvements in Ozone Generators, of which the following is a specification.

This invention relates to an improvement in ozone generators.

A primary object is to provide a device having adequate cooling facilities so that high frequency currents can be economically and safely used. That is to say, the present invention contemplates an apparatus including novel features of construction whereby the electrodes may be kept at a safe temperature and the dielectric elements also maintained at a maximum state of efficiency and their period of use materially lengthened not only because of safe temperature conditions but also by reason of the novel arrangement and structural features of the electrodes which eliminate the so-called creeping discharge or sliding sparks given off at the edges of the inner electrode.

Another object of the invention is to provide separate cooling systems for the central electrode and the outer casing or electrode, thereby insuring better distribution of the cooling media to properly maintain the efficiency of the device. In that connection it is pointed out that it is not only advantageous to cool the electrodes in such a way that they can handle high-frequency currents, but also by maintaining the electrodes relatively cool the dielectrics will not become conductors as they do when overheated, or will not break down as readily.

A further object of the invention is to provide a construction which is susceptible of embodiment in a tubular form, thereby obtaining maximum generating surface and yet occupying a minimum space.

A still further object of the invention is to provide a simple, practical and reliable construction which is capable of producing large quantities of ozone through the use of undamped high-frequency alternating currents. That is to say, it is the purpose of the present invention to provide a machine which by reason of its novel structural features and characteristics is capable of producing ozone in large quantities at a minimum cost thereby rendering it more readily available for use on a large commercial scale.

With the above and other objects in view which will more readily appear as the nature of the invention is better understood, the same consists in the novel construction, combination, and arrangement of parts hereinafter more fully described, illustrated and claimed.

A preferred and practical embodiment, together with a modification thereof is shown in the accompanying drawings, in which:—

Figure 1 is a vertical sectional view partly in elevation of the present device.

Figure 2 is a top plan view of the construction shown in Figure 1.

Figure 3 is a horizontal cross-sectional view taken on the line 3—3 of Figure 1.

Figure 4 is a view similar to Figure 1, somewhat enlarged, illustrating a modification.

Similar reference characters designate corresponding parts throughout the several figures of the drawings.

The present device includes in its organization a tubular casing designated generally as A and having a tubular electrode B therein, the same being arranged to permit of utilizing a thermo-circulating system C for the electrode B, and a water circulating system for cooling the casing A.

In the above connection it may be pointed out that the thermo-circulating system for the central electrode B is cooled by the water circulating system for the hollow casing or jacket A, the water in the circulating system D being constantly removed and replaced while the fluid of the circulating system C moves by thermal action in a continuous circuit. The fluid in the system C is preferably kerosene or other oil of low viscosity.

Referring more particularly to the structural features and characteristics of the device it will be observed that the casing A in Figure 1 is preferably supported upon a suitable stand or base 1 and the outer and inner walls 2 and 3 thereof are spaced to provide a water circulating jacket 4, the said inner wall 3 being provided with the annular depressions 5 which form continuous graduated air gaps or spaces lying opposite the shouldered ends 7 of the central tubular electrode B, the purpose and effect of which is fully described in my Patent No. 1,436,251, dated November 21, 1922, and which will hereinafter be more fully referred to in connection with the operation of the present device.

As shown in Figure 1 the central electrode B consists of a main body portion 8 and the contracted end portions 9 which project beyond the limits of the casing A and are engaged and supported by the insulating centering bushings 10 and 11, suitable packing gland means G being employed in each instance to provide an air tight joint.

The insulating centering bushings 10 and 11 are preferably of similar construction and design thereby facilitating manufacture and assembly, and one of these bushings 10 for example may have connected therewith a pipe 10ᵃ for receiving air under pressure while the other bushing 11 may be provided with an outlet pipe 11ᵃ for conducting away the ozone. As will be observed from the drawing the said bushings are provided with an interior bore 12 of larger diameter than the reduced end portions 9 of the central electrode B thereby to insure communication between the inlet and ozone outlet pipes and the generating space between the electrodes as will presently appear. Also the said bushings may be provided with the attaching flange 13 and the concentric dielectric spacing and holding flanges 14, the same being adapted to interlock with and properly space and hold the concentric tubular dielectric members 15 and 16.

The dielectric member 15 overlies and covers the inner wall 3 of the casing A throughout its length thus bridging the air gaps 6, and the inner dielectric 16 surrounds and engages with the body 8 of the central electrode B. However, by reason of the difference in diameter between the body 8 and the ends 9 of the electrode, the opposite ends of the dielectric member 16 are spaced a considerable distance from the ends 9 of the electrode so that no brush discharge or sparking is possible at the ends of the electrode.

For the purpose of permitting the air to circulate between the dielectrics and thereby produce the ozone, the opposite ends of the inner tubular dielectric 16 are provided with suitable openings 17, thereby establishing direct communication between the air inlet and the ozone outlet so that as the air is admitted it may be rapidly passed through the zone of the brush discharges between the dielectrics 15 and 16 as the high-frequency current tends to jump from the body 8 of the electrode B to the wall 3 of the casing.

By reason of the fact that the casing A is constructed to provide an enlarged air gap 6 lying opposite the shoulder or edge 7 of the electrode B the concentrated heat of the accumulated brush discharges at the edges 7 will be eliminated, thereby neutralizing the effect of sliding sparks or in other words by reason of the graduated air gap cause a proportionate dying away of the capacity and energy at the edges 7 of the electrode, thereby preventing the burning out or puncturing of the dielectrics 15 and 16 at this point.

It is one of the distinctive features of the present invention that a graduated air gap is provided in a zone adjacent the point of junction of the body of the tubular electrode and the reduced end portions thereof. In other words it is one of the primary features of the present construction to provide one of the electrodes with a wall portion progressively receding with respect to the face of the opposite electrode to avoid the concentration of the brush discharges due to the tendency of an electric current to jump from an edge or a corner. By providing such a construction the concentration is minimized to the greatest possible extent, thereby neutralizing the effect of sliding sparks or the so-called creeping brush discharge and having the important advantage of preventing the "blowing" of the dielectric members which would not otherwise be able to stand the tremendous heat but for a relatively short period of time.

The feature of providing a graduated gap may be readily carried out as shown in Figure 1 by providing the annular offset part 5 in the casing A as shown in Figure 1, or it may be accomplished in an alternative way as shown in Figure 4 wherein the central electrode B' is provided with a rounded shoulder 7ᵃ while the inner wall 3ᵃ of the casing A' is made of uniform diameter throughout. The result in the construction shown in Figure 4 is the same as obtained in the construction of Figure 1, and it will therefore be understood that it is within the scope of the present invention to use any construction which will have the effect of producing a graduated reduction of the brush discharge which passes between the dielectrics at the points where the active surface of the central electrode terminates.

Having provided means for preserving the dielectric members 15 and 16, as above described, thereby preventing their rupturing, puncturing, or blowing at the ends of the active portion of the central electrode, another distinctive feature of the invention resides in providing means for adequately cooling the outer electrode or casing and the central electrode.

By keeping the electrodes cool the present machine is particularly adapted to generate ozone by using air under pressure and undamped high frequency currents which generate a relatively high degree of heat. And, to that end, the central electrode B is provided with a thermal oil-circulating system C and the casing A is provided with a water circulating system D, the oil or other fluid of the system C is arranged to be cooled by the water of the circulating system which may be supplied and removed from the present device, under pressure if desired, so as to insure adequate quantities of cool water always being available and then carried to waste so that it is practically impossible for excess heat to be retained in the device.

Accordingly, by reference to Figure 1 of the drawings it will be observed that the reduced end portions 9 of the central electrode B are preferably threaded as indicated at 18 and the upper end 9 has fitted thereto an aluminum L-fitting 19 provided with a suitable gland member 20 for receiving the end of a circulating pipe 21. This pipe is preferably fitted with an expansion or reserve cup 22 and connects with the upper end of a tank 23 arranged within a water jacket 24 and communicates at its lower end, as indicated at 25, with an angular pipe or conduit 26 which in turn communicates with the L-fitting 27 through the packing gland 28. The said L-fitting 27 is preferably of aluminum and is fitted to the threads 18 of the lower end 9 of the electrode B which is also preferably of aluminum. Also said member 27 is provided with a line wire terminal 29 connected with a suitable high-tension transformer T as indicated at 30, the said transformer T being also connected by the line 31 with the casing A, and, the latter being grounded as indicated at 32.

The pipes or conduits 21 and 26 of the oil circulating system C may be made of glass or any other insulating material so as to insulate the central electrode B from the water cooling system and by reason of the provision of the expansion and reserve cup 22 the heated oil will have room to expand and also the oil of the system may be readily replenished at this point.

By reason of the novel oil circulating system C provided for the central electrode B it will be apparent that as the oil or other fluid, becomes heated in the body 8 of the electrode B it will rise through the upper reduced end 9 of the electrode and make its way through the conduits 19 and 21 to the tank 23 which is surrounded by the water jacket 24. As the oil is cooled in this tank it will descend through the conduits 26—27 to the lower end 9 of the electrode B in the well known manner.

The water jacket 24 is provided with a water inlet connection 33 for receiving cold water from any suitable source, a pump if desired, and the upper end of the water jacket is fitted with a pipe 34 which communicates as at 35 with the water circulating space 4 in the casing A. The heated water from the casing A is discharged or conducted away by any suitable means, through the outlet or discharge pipe 36 arranged at the top of the casing A. Therefore, the cooling water entering the jacket 33 performs the dual function of cooling the oil of the thermo-circulating system C and also cooling the outer electrode or casing A.

The construction shown in Figure 4 is in all essential particulars the same as that shown in Figure 1 with the exception that the graduated air gap is formed by providing the electrode B with a rounded edge 7ª instead of a relatively abrupt corner or edge 7 as shown in Figure 1 to provide the advantageous results heretofore pointed out. That is to say, this construction represents a carrying forward of the idea of providing one of the electrodes with a wall portion progressively receding with respect to the face of the opposite electrode to provide a graduated air gap possessing the desired insulating features to eliminate the sliding sparks, etc.

As will also be observed in Figure 4 the central electrode B' may be formed of glass, the inside of which is plated or silvered as indicated at $x$. This type of electrode may be particularly advantageous when using currents of heavy density.

When a silver coated glass electrode is used as shown in this figure it is not necessary to use an inner dielectric member because the glass tube itself will act as a dielectric. The results are precisely the same as the construction shown in Figures 1 and 4, and furthermore the cooling systems for the inner and outer electrodes are also the same.

When the device is set up as shown in the drawings the undamped high-frequency alternating current from the transformer T is supplied to the terminal 29 which is in electrical contact with the central electrode B. As previously explained the casing A is also connected with the transformer and grounded so that when the circuit is closed to the generator the high tension current will endeavor to pass between the electrodes A and B through the air gap provided between the spaced tubular dielectric members 15 and 16, thus resulting in the usual brush discharge, which however, is materially intensified through the employment of undamped high frequency currents.

Due to the novel graduated air gap provided at the zone wherein the active surface of the central electrode terminates, the damaging effects of the creeping discharge or sliding sparks are eliminated, and the air fed under pressure to the space between the d'electrics 15 and 16 produces large quantities of ozone which is discharged from the apparatus and carried to the point of use. When the generating action is in progress the oil or other involatile fluid of the thermo circulating system C will keep the central electrode B relatively cool, and as previously explained the water of the circulating system D will keep the fluid of the thermo-system cool and also prevent excessive overheating of the casing or outer electrode A.

Without further description it is thought that the many novel features and advantages of the present invention will be readily understood by those skilled in the art, and it will of course be understood that changes in the form, proportion and other minor details of construction may be resorted to within the scope of the appended claims.

I claim:—

1. An ozone generator including tubular electrodes, one of which is provided at the end of its active generating surface with a wall portion progressively receding with respect to the face of the opposite electrode.

2. An ozone generator including tubular electrodes, one of which is formed to provide an enlarged air gap between the end of its active generating surface and the opposite electrode.

3. An ozone generator including tubular electrodes, one of which is formed to provide a graduated air gap between the end of its active generating surface and the opposite electrode.

4. An ozone generator including a tubular electrode formed with a shoulder, a tubular casing having an enlarged air gap adjacent the said shoulder of the electrode, and a dielectric crossing the air gap.

5. An ozone generator including a central tubular electrode having an enlarged medial portion and reduced end portions, a tubular casing surrounding said central electrode and having enlarged air gaps lying adjacent the ends of the active surface of said central tubular electrode, and dielectric members between said electrode and the casing and crossing the air gap.

6. An ozone generator including a central tubular electrode of different diameters, a casing formed with enlarged graduated air gaps adjacent the edge formed between the portions of different diameter of the central electrode, and tubular dielectric members arranged between the electrode and the casing and crossing the air gaps.

7. An ozone generator including a tubular central electrode and a tubular surrounding casing, tubular spaced dielectric members between the central electrode and the casing, means for supplying air to the space between said dielectric members, and an ozone outlet also in communication with the space between the dielectrics.

8. An ozone generator including a tubular central electrode and a tubular surrounding casing, tubular spaced dielectric members between the central electrode and the casing, means for supplying air under pressure to the space between said dielectric members, and an ozone outlet also in communication with the space between the dielectrics.

9. An ozone generator including a tubular central electrode, means for supplying undamped high-frequency alternating currents thereto, a tubular casing surrounding said central electrode, spaced dielectric members arranged between the central electrode and the casing, means for supplying air to the space between the dielectrics and means also communicating with the space between the dielectrics for conducting away the ozone.

10. An ozone generator including a hollow casing having a central bore, a tubular electrode member arranged within said bore, and means for securing said central electrode member in position comprising insulating centering bushings adapted to be attached to said casing.

11. An ozone generator including a hollow casing having a central bore, a tubular electrode member arranged within said bore, and means for securing said central electrode in position within the bore of the casing, said means comprising chambered insulating centering bushings adapted to be attached to said casing.

12. An ozone generator including a hollow casing having a central bore, a tubular electrode member arranged within said bore, and means for securing said central electrode in position within the bore of the casing, said means comprising chambered insulating centering bushings adapted to be secured to the casing at opposite ends of the bore, an inlet pipe communicating with the chambered portion of one bushing and an outlet pipe communicating with the chambered portion of the other bushing.

13. An ozone generating apparatus including a hollow casing having a central tubular wall portion, a central hollow electrode member arranged within said tubular wall portion of the casing and formed with an enlarged intermediate body portion and reduced end portions, insulating centering bushings for receiving the reduced end portions of the central electrode and adapted to be attached to the casing at the ends of the central tubular wall, said centering bushings being chambered and having inlet and outlet connections respectively, fluid conducting pipes coupled with the reduced end portions of the central electrode, and means for supplying a cooling medium to said hollow casing.

14. An ozone generator including a hollow electrode and a surrounding hollow casing, a thermo-fluid cooling system for said electrode including a tank, a jacket surrounding said tank, and piping connections between said jacket and the hollow casing.

15. An ozone generator including a central tubular electrode having a body and reduced end portions, a hollow casing, tubular dielectric members between the electrode and the casing, one of said dielectrics being provided with openings, means engaging the casing for positioning the central electrode and spacing the dielectrics, air inlet means, ozone outlet means, and cooling means for the central electrode and casing.

16. An ozone generator including a tubular central electrode having a body and reduced end portions, a tubular casing, tubular dielectric members between the electrode and the casing, one of said dielectric members being provided with openings, insulating bushings adapted to be carried by the casing to support and position the central electrode and the dielectric members and said bushings provided with air intake and ozone outlet chambers communicating with the space between the dielectrics through the openings in one of said dielectrics.

17. An ozone generator including a tubular central electrode and a surrounding tubular casing, tubular dielectrics between the electrode and the casing, a thermo cooling system for the central electrode including a tank in piped communication with the opposite ends of the said central electrode, a liquid jacket surrounding said tank, and pipe connections between said jacket and the tubular casing.

18. An ozone generator including a tubular central electrode and a tubular casing assembled with their axes concentric and perpendicular, a thermo cooling system communicating with the tubular central electrode and a separate cooling system for said casing.

19. An ozone generator including liquid cooled central and outer electrodes, the said central electrode being cooled by a thermo-oil circulating system including a tank in piped communication with the electrode, an expansion and filling cup for the thermo circulating system, a water jacket for said tank, a pipe connection between the upper end of said pipe and the upper end of said casing, a water inlet connection for said jacket, and a discharge connection for said casing.

20. An ozone generator including inner and outer electrodes, means for cooling the outer electrode, and means insulated from said means for cooling the outer electrode and adapted to cool the inner electrode.

21. An ozone generator including hollow inner and outer electrodes, a water cooling system for the outer electrode, an oil cooling system for the inner electrode, and insulating pipes for conveying the oil for cooling the inner electrode through a portion of said water cooling means.

22. An ozone generator including inner and outer electrodes, a water circulating system for cooling the outer electrode, and an insulating fluid cooling system for cooling the inner electrode.

23. An ozone generator including electrodes, a water circulating system for cooling one of said electrodes, and an insulating fluid cooling system for cooling the other of said electrodes.

24. An ozone generator including electrodes, a water circulating system for cooling one of said electrodes, and an insulating fluid cooling system for cooling the other of said electrodes, said insulating fluid cooling system being partially cooled by said water circulating system.

In testimony whereof I hereunto affix my signature in the presence of two witnesses.

HARRY BUXTON HARTMAN.

Witnesses:
JESSE S. COOK,
MABEL M. ROSENSTEELE.